(12) United States Patent
McLaughlin (10) Patent No.: US 12,456,475 B2
(45) Date of Patent: Oct. 28, 2025

(54) VOICE RECORDING PENDANT SYSTEM

(71) Applicant: Signal Essence, LLC, Mountain View, CA (US)

(72) Inventor: Hugh Joseph McLaughlin, Mountain View, CA (US)

(73) Assignee: SIGNAL ESSENCE, LLC, Mountain View, CA (US)

( * ) Notice: Subject to any disclaimer, the term of this patent is extended or adjusted under 35 U.S.C. 154(b) by 214 days.

(21) Appl. No.: 18/458,131

(22) Filed: Aug. 29, 2023

(65) Prior Publication Data

US 2024/0304202 A1   Sep. 12, 2024

Related U.S. Application Data (60) Provisional application No. 63/489,416, filed on Mar. 9, 2023.

(51) Int. Cl.
| | |
|---|---|
| G10L 21/0216 | (2013.01) |
| G06F 1/16 | (2006.01) |
| G10L 21/0208 | (2013.01) |

(52) U.S. Cl.
CPC .......... *G10L 21/0216* (2013.01); *G06F 1/163* (2013.01); *G10L 2021/02166* (2013.01)

(58) Field of Classification Search
CPC ....... G10L 21/0216; G10L 2021/02166; G10L 21/0208; G06F 1/163
See application file for complete search history.

(56) References Cited

U.S. PATENT DOCUMENTS

| | | |
|---|---|---|
| 8,060,031 B2 | 11/2011 | Henderson |
| 2009/0074224 A1 | 3/2009 | Wright |
| 2017/0105066 A1* | 4/2017 | McLaughlin .......... H04R 1/406 |
| 2019/0325874 A1 | 10/2019 | Carreras et al. |
| 2020/0349954 A1 | 11/2020 | Yoshioka et al. |
| 2022/0368981 A1* | 11/2022 | Butler ................ H04N 21/4882 |

FOREIGN PATENT DOCUMENTS

| | | | |
|---|---|---|---|
| WO | WO-2018127298 A1 * | 7/2018 | ............. H04R 3/005 |
| WO | WO-2018144896 A1 * | 8/2018 | ......... G10L 21/0216 |

OTHER PUBLICATIONS

"Speech Zone for B3000 Badge", ED Device Bseries Production Docs, downloaded from https://pubs.vocera.com/device/bseries/production/help/bseries_ug_help/device/bseries/production/topics/ug_b3000_speech_cone.html, Feb. 13, 2023.
International Search Report dated Jun. 7, 2024 for international application No. PCT/US 24/18490, 12 pgs.

\* cited by examiner

*Primary Examiner* — Daniel C Washburn
*Assistant Examiner* — Penny L Caudle
(74) *Attorney, Agent, or Firm* — Fountainhead Law Group, PC (57) ABSTRACT

A wearable pendant is configured to be worn by a first speaker to record audio spoken by the first speaker of the pendant and to record audio spoken at least a second speaker who interacts with the first speaker. The pendant includes at least two or more microphones to pick up audio spoken by the first and second speakers. The audio is channelized and filtered to produce clean audio signals of the first and second speakers, which can be stored for subsequent processing.

21 Claims, 13 Drawing Sheets

1st order differential array

Cross section of polar response of vertical
array where microphones are simply summed.

VOICE RECORDING PENDANT SYSTEM

CROSS REFERENCE TO RELATED APPLICATIONS

Pursuant to 35 U.S.C. § 119(e), this application is entitled to and claims the benefit of the filing date of U.S. Provisional App. No. 63/489,416, filed Mar. 9, 2023, titled "Voice Recording Pendant System," the content of which is incorporated herein by reference in its entirety for all purposes.

BACKGROUND

The present disclosure relates to a voice recording device. Speech can be captured by any ordinary microphone such as a microphone designed to be worn on a lapel or on a lanyard. A problem with such a microphone is that the quality of sound can be poor, and it is difficult for a speech recognition system to accurately assign the words that are detected to the correct talker when there are two or more talkers. The process of assigning speech to the correct talker is called diarisation.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The present disclosure relates to a voice recording device with two or more microphones that can be worn on a person either by a lanyard or a clip and which capture the sound of both the person who is wearing the device and nearby talkers. The voice recording device converts the signals to form two channels: one channel that is mostly comprised of the person who is wearing the device and a second channel which is mostly composed of the nearby talkers minus any sounds from the person wearing the device.

This may include, without limitation a recording device: that also records video, has a Bluetooth connection, has a Wi-Fi connection, or any device that seeks to provide two clean channels of speech to present one channel of the pendant wearer, and another channel containing speech of the nearby talkers. The device forms high quality voice capture by utilizing two or more microphones to 1) differentiate spatially between the wearer and the adjacent talkers, and 2) to construct an accurate representation of the original speech signals while reducing unwanted noise and reverberation.

An area where embodiments in accordance with the present disclosure can be quite useful is for recording voices and to further aid speech recognition software to convert the channelized sound into a transcript where the participants are identified. This is useful for generating a transcript of a conversation between a salesperson and a customer for later analysis or review or for the customer to have a record of a complex conversation. It could also be useful for accurately generating a transcript of a conversation between a policeman and a citizen. If a system could be designed that could create channels where the sound is separated using spatial information of the direction of the sound, then channels can be presented to the speech recognizer making diarisation nearly trivial.

A microphone that is worn may be a directional type of microphone. This type of microphone has a microphone capsule where the gradient of the sound between the front of the capsule and back of the capsule is sensed creating directional pickup of the person who is wearing the microphone. But in this case the sound coming from an adjacent talker is attenuated and noisy. What is needed is a microphone system that improves the sound of the wearer and improves the sound that is received from the adjacent talker.

When speech recognition is performed, sources of error include reverberation, interfering sounds, nearby talkers, and persistent noise. The speech recognition accuracy can be improved by reducing reverberation and reducing or eliminating sounds from interfering talkers. To achieve the performance improvements, systems can use several microphones in a cooperative way to improve the speech signal. The use of several microphones is called a microphone array. It should be noted that there are systems that have multiple microphones, but they do not act as a beamforming array. On most cell phones, for example, there are two microphones. One microphone is at the bottom and picks up the talker's voice, while the other microphone is near the top and is used as a noise reference. Both signals are analyzed in real-time to separate out the desired sound from the ambient noises.

Microphone arrays may include several geometrically arranged microphone sensors for receiving sound signals (such as speech signals) and converting the sound signals to electrical signals. The electrical signals may be digitized by analog-to-digital converters (ADCs) for converting into digital signals which may be further processed by software that runs on a processor either on the device or on a remote server (in the cloud). Compared with a single microphone, the sound signals received by a microphone array may be further processed for noise reduction, speech enhancement, sound source separation, de-reverberation, spatial sound recording, and source localization and tracking. The processed digital signals may be presented to a speech recognition software.

Additive microphone arrays may achieve signal enhancement and noise suppression based on delay-and-sum principles. In the present disclosure, the phrase "delay and sum" is interchangeable with the word "additive". To achieve better acoustic noise suppression, additive microphone arrays may include a large inter-sensor distance. They are effective when the spacing between the microphones is approximately one half of the wavelength of the signal of interest.

Speech, however, is very broadband, spanning many octaves. To be effective at low frequencies, the microphone elements would have to be separated apart from each other so much that the device would be bulky. At high frequencies the main beam may be very narrow and there will be a lot of strong side lobes. Consequently, additive microphone configurations are limited to a small range of frequencies. An advantage of an additive microphone array is that they are simple to implement and the mere act of adding the microphone signals together reduces the self-noise of the microphone elements, where the self-noise is caused by electrical noise that emanates from each microphone element.

In contrast, differential microphone arrays (DMAs) allow for small inter-microphone distance and may be made very compact. DMAs include an array of microphone sensors that are responsive to the gradients (differences of sound pressure) of the acoustic pressure field. The disadvantage of DMAs is that they are sensitive to electrical self noise that comes from the microphone element. Unlike environmental noise, the microphone sensor noise is inherent to the microphone sensors and therefore is present even in a soundproof environment such as a sound booth. In addition, DMAs always require equalization to compensate for the fact that taking the difference of the microphone sensors distorts the frequency response and that needs to be inverted to result in a flat frequency response. The equalization is only perfect if the direction of the talker is exactly in line with the intended direction of the DMA beam. In the present disclosure, the word "equalization" is used interchangeably with "compensator".

There exists a need for a device that can be worn that channelizes the sound to provide one channel that contains the voice of the person wearing the devices and another channel that contains the sound of the other talkers minus the voice of the person wearing the device. It will further be shown that the microphones must be arranged in a determined way to enable it to differentiate between the upward facing direction (the person wearing the device) and the side facing direction.

Embodiments in accordance with the present disclosure allow for reception of sound in two directions: 1) upward toward the mouth of the person wearing the pendant, and 2) outward toward talkers who are generally in front of the person wearing the pendant.

Figure 1:
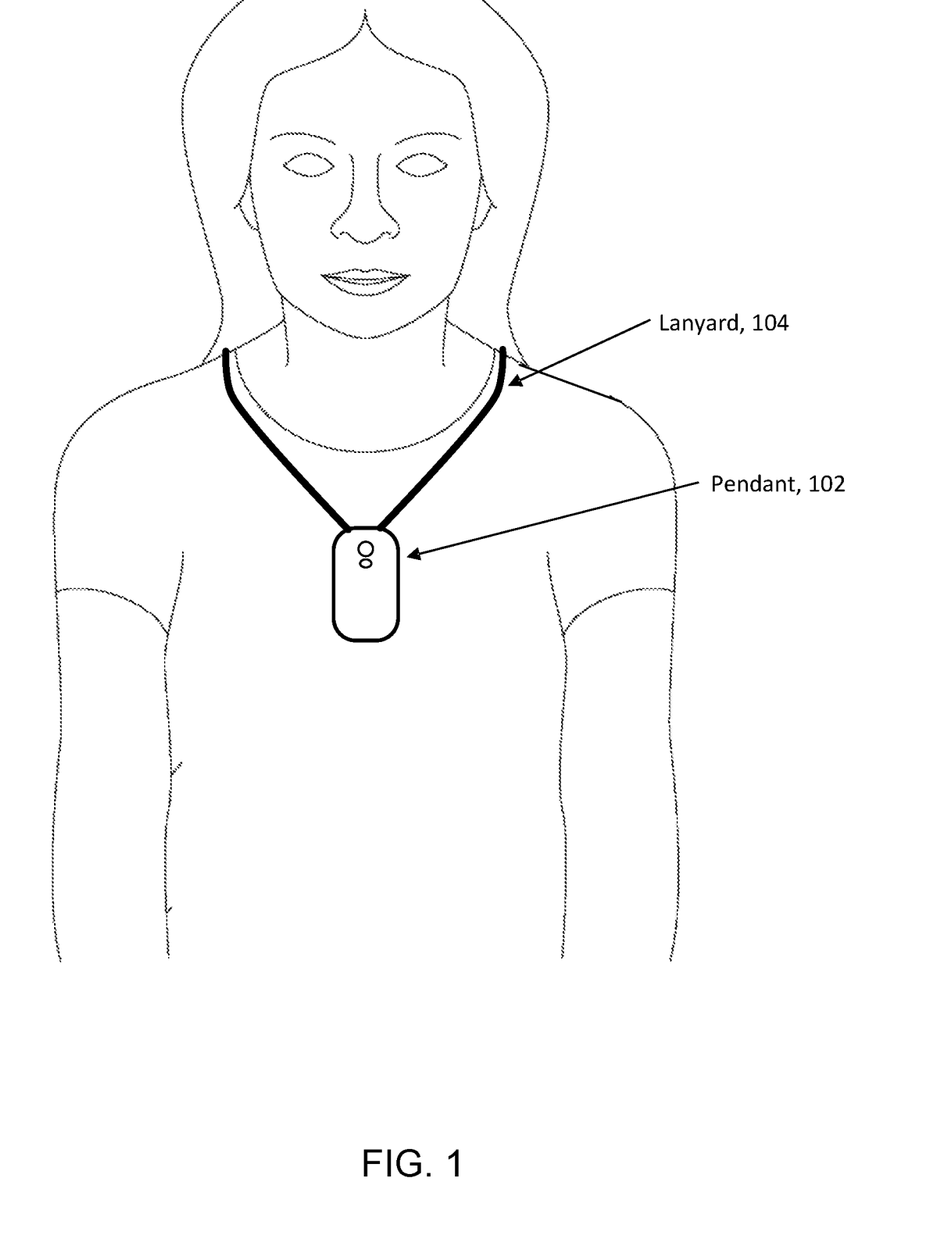
FIG. 1 shows the front view of an embodiment of the invented device worn on a lanyard on a person.
Figure 2:
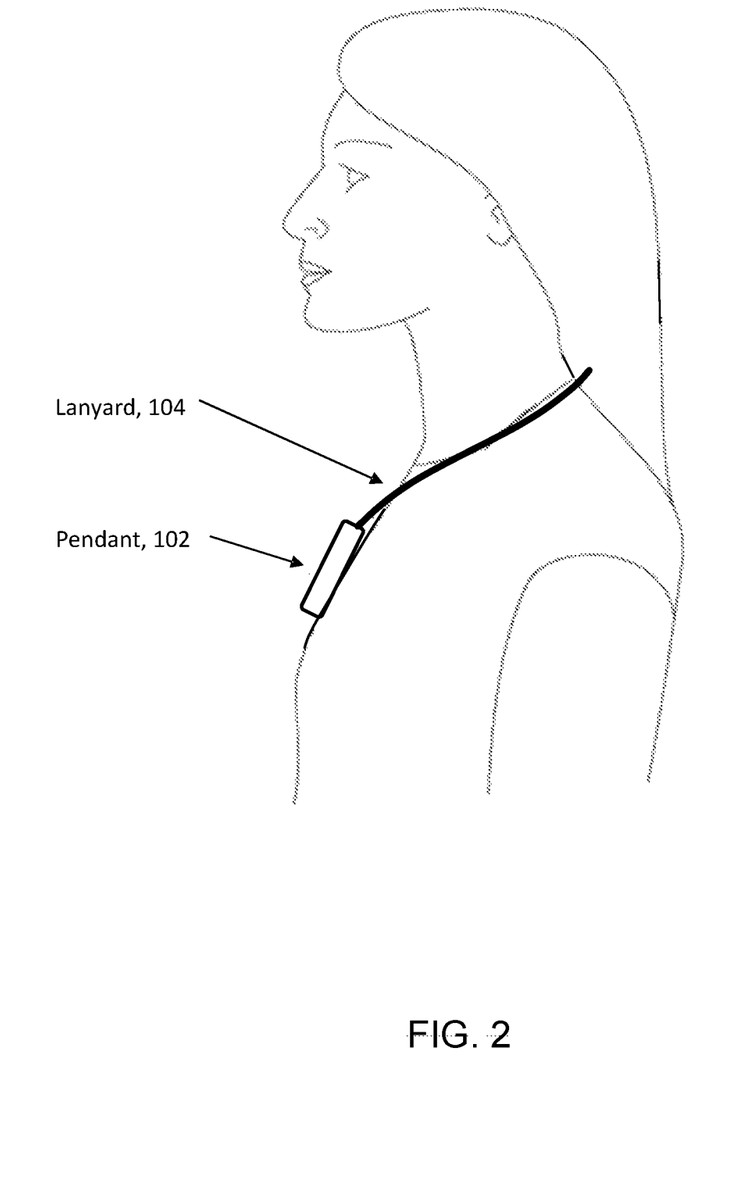
FIG. 2 shows a side view of an embodiment of the invented device worn on a lanyard on a person.
Figure 3:
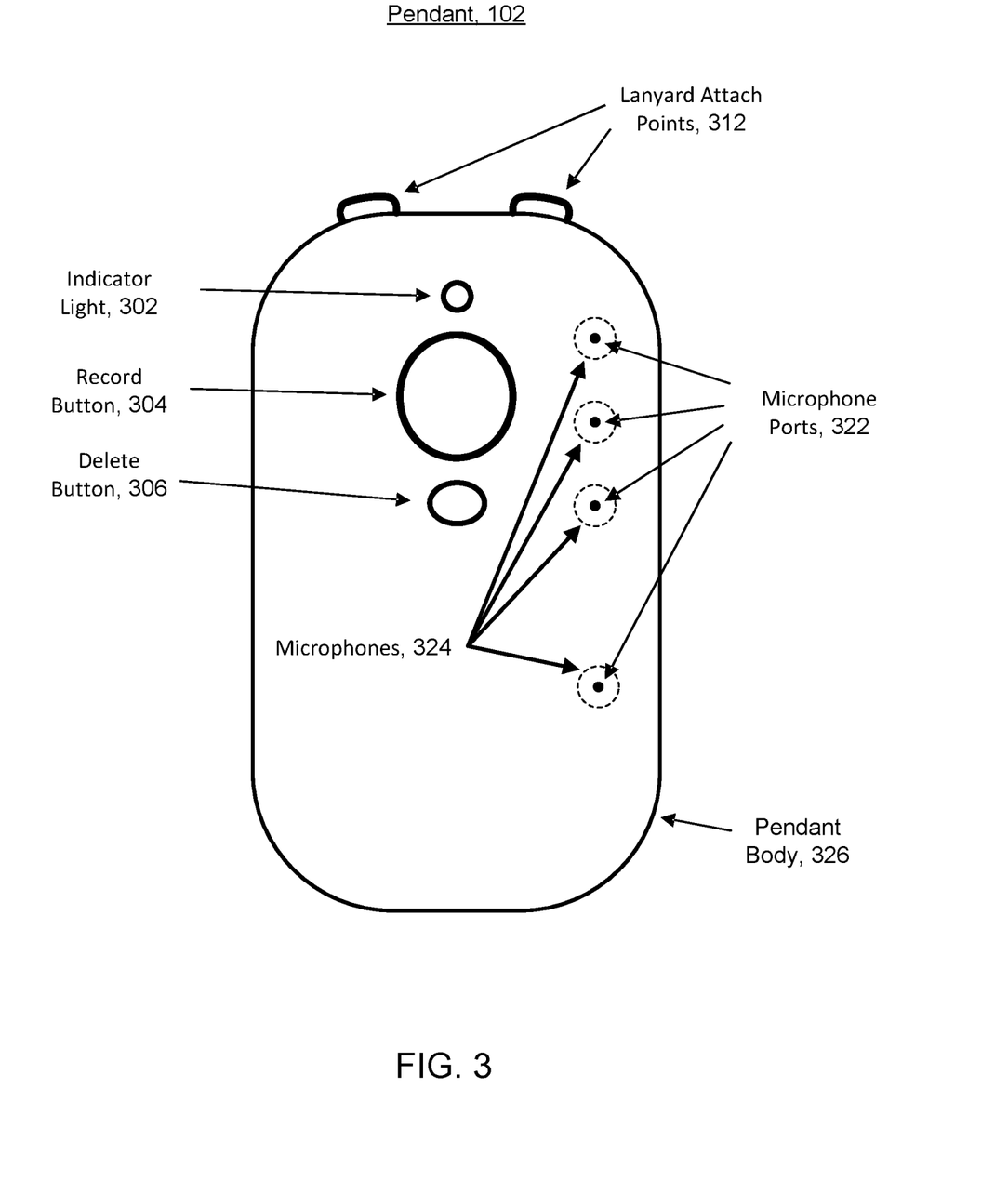
FIG. 3 shows a detailed front view of an embodiment of the invented device.

What is described is a system that comprises a wearable electronic pendant 102 shown in FIG. 1 and FIG. 2 that is worn by a human on a lanyard, a clip, or other means of attaching the pendant to a person. FIG. 1, for example, shows a front view of the pendant 102 on a person wearing a lanyard 104. FIG. 2 shows a side view of the pendant 102 on a person wearing a lanyard 104. FIG. 3 shows a closer view of the pendant 102 which shows the vertical alignment of the microphone ports 322. The lanyard 104 attaches to the pendant 102 at two points 312. By having two attachment points, the lanyard 104 is less likely to rotate around, which could happen with a single attachment point. The attachment points 312 are near the top of the body 326 of the pendant 102. This allows the weight of the pendant 102 to keep it mostly vertically aligned with gravity.

Embodiments in accordance with the present disclosure have two or more pressure sensing microphones 324 where the microphones are arranged so that gravity keeps the microphones arranged vertically. Two microphones are used in some embodiments, although other embodiments can have three or four microphones. FIG. 3 shows four microphones 324, indicated by the microphone ports 322. The microphone outputs are digitized to produce samples. The samples are processed to create two channels, one that contains mostly the voice of the person wearing the pendant 102, and the other channel consisting of sound coming from the side minus the voice of the person wearing the pendant 102. The sound coming from the person wearing the pendant 102 can be referred to as the "up" channel, and the sound coming from voices coming from the side can be referred to as the "side" channel. The process of converting the microphone samples into channels is referred to as channelization. This channelization processing can be performed by circuitry that comprises either: 1) computer processing means housed in the pendant 102; or 2) a communication circuit to transmit the samples for off-line processing by a remote computer system such as a cloud computing platform.

Figure 4:
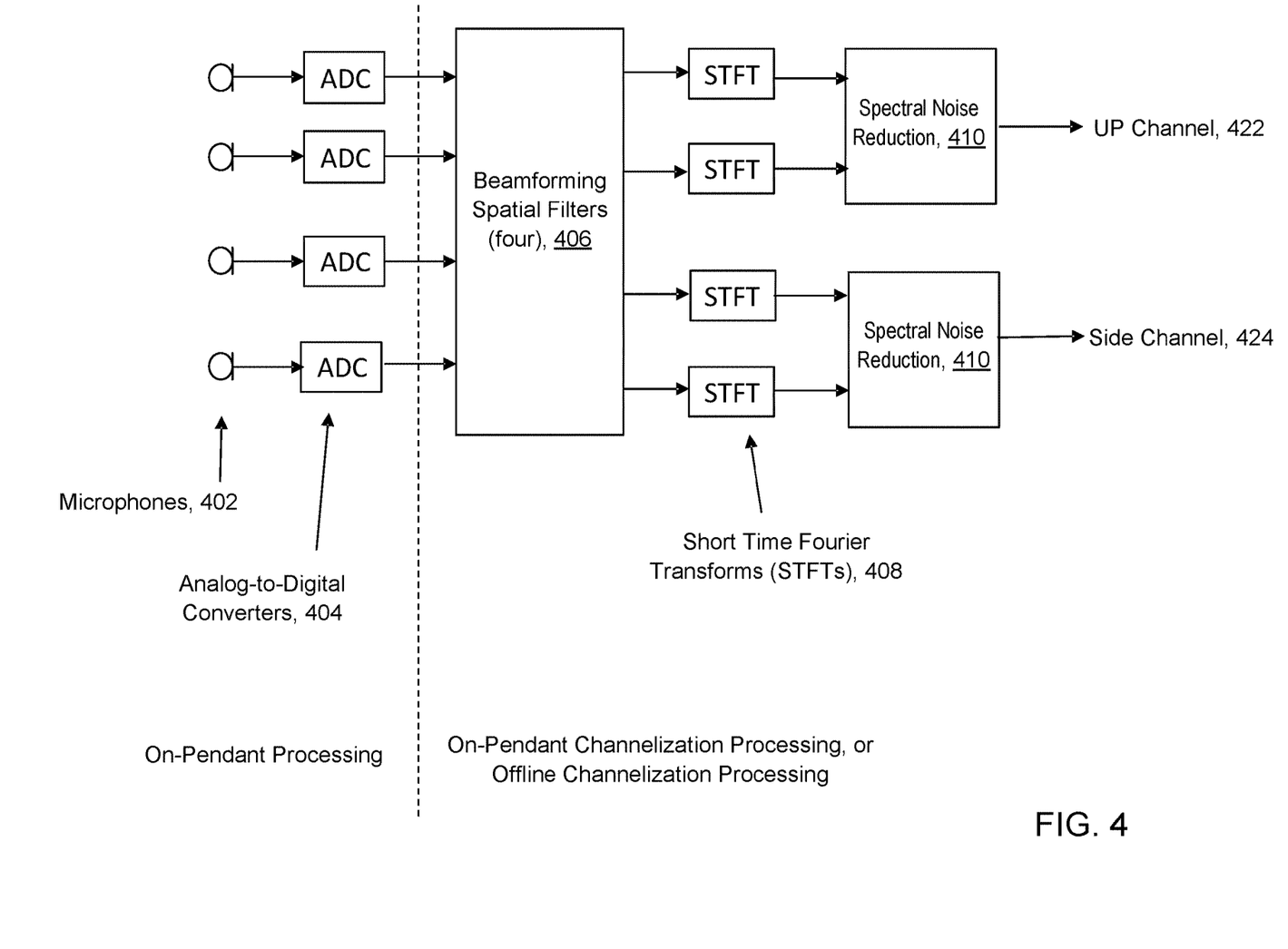
FIG. 4 shows the signal flow from sound pressure sensed by the microphones to final output.

FIG. 4, shows the signal flow. The microphones 402 sense the sound pressure, and the electrical signal is converted to digital samples by corresponding analog-to-digital converters (ADC) 404. In some embodiments, the samples can be further processed with channelization processing to produce an up channel signal 422 and a side channel signal 424. In some embodiments, the channelization processing can include beamforming spatial filters 406, short time Fourier transforms 408, and spectral noise reduction filters 410, details of which are discussed below in connection with FIG. 5. As shown in FIG. 4, the ADCs 404 that convert the microphone 402 signals to produce microphone samples can be processed by means for computing an up channel audio signal and a side channel audio signal from captured audio in accordance with the present disclosure. In some embodiments, the means for computing can be a processor (e.g., hardware (circuitry), including for example, data processing hardware such as an ASIC (application specific integrated circuit), FPGA (field programmable array), a data processing unit, and the like) housed in the pendant body 326 that is programmed or otherwise configured for channelization processing to compute the up channel audio signal and the side channel audio signal in accordance with the present disclosure. In other embodiments, the means for computing can be a remote computing system (e.g., computer, cloud computing system) separate from the pendant 102, where the pendant body houses communication circuitry (e.g. wired serial port connection such as USB, or wireless communications such as Wi-Fi, Bluetooth, and the like) to communicate the captured audio to the remote computing system to perform the channelization processing in accordance with the present disclosure.

Figure 5:
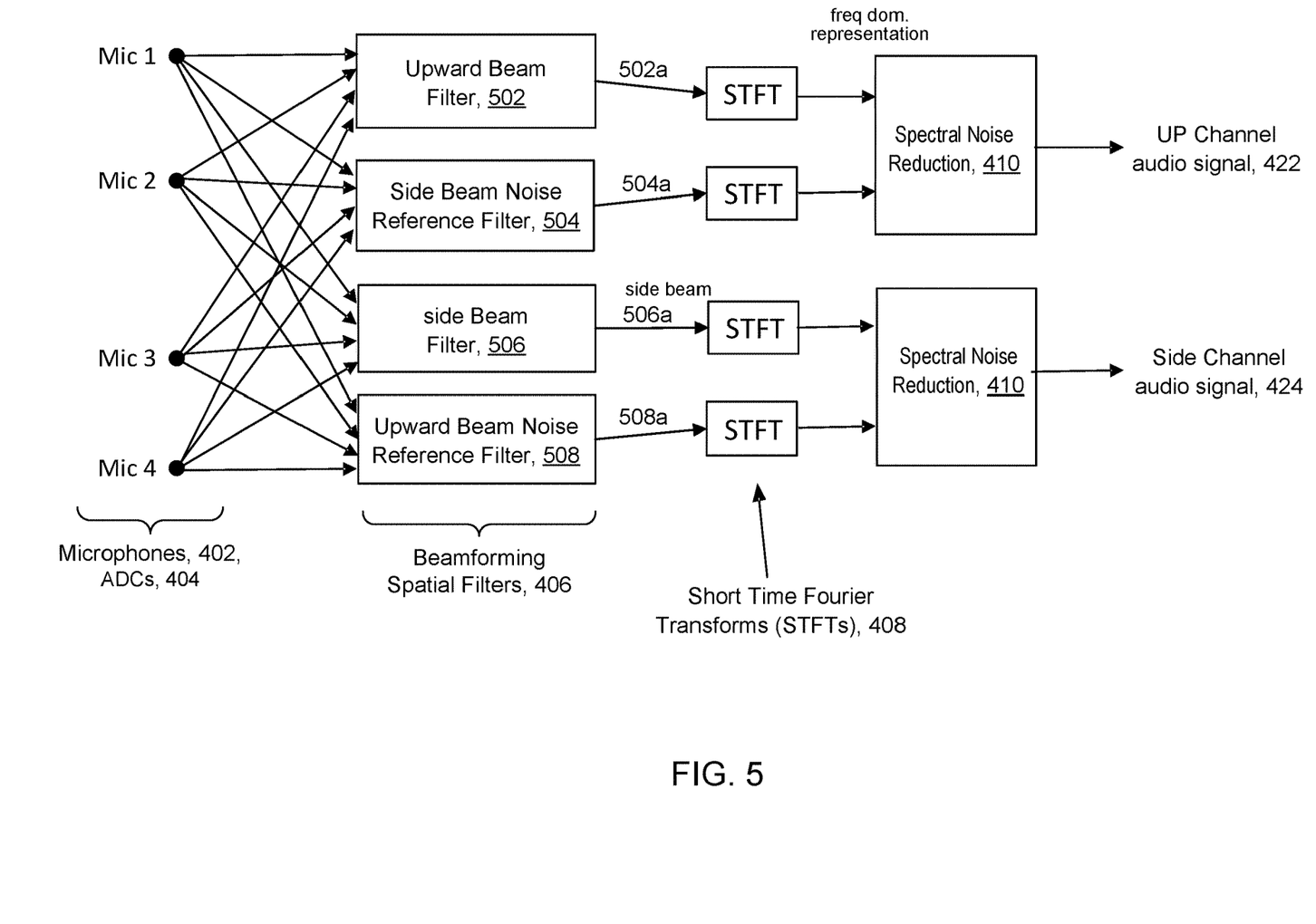
FIG. 5 shows the signal flow from microphone signals to final output.

FIG. 5 shows the channelization processing. Regardless of the number of microphones, four signals are created by four beamforming filters including: (1) upward facing beamforming filter 502 to pick up the person wearing the pendant 102, (2) a side-facing beamforming filter 504 with a null toward the up direction to act as the noise reference for further processing, (3) a side-facing filter 506 with a null toward the up direction to pick up the side talkers, and (4) an upward facing beamforming filter 508 to use as the noise reference for further processing.

Figure 6:
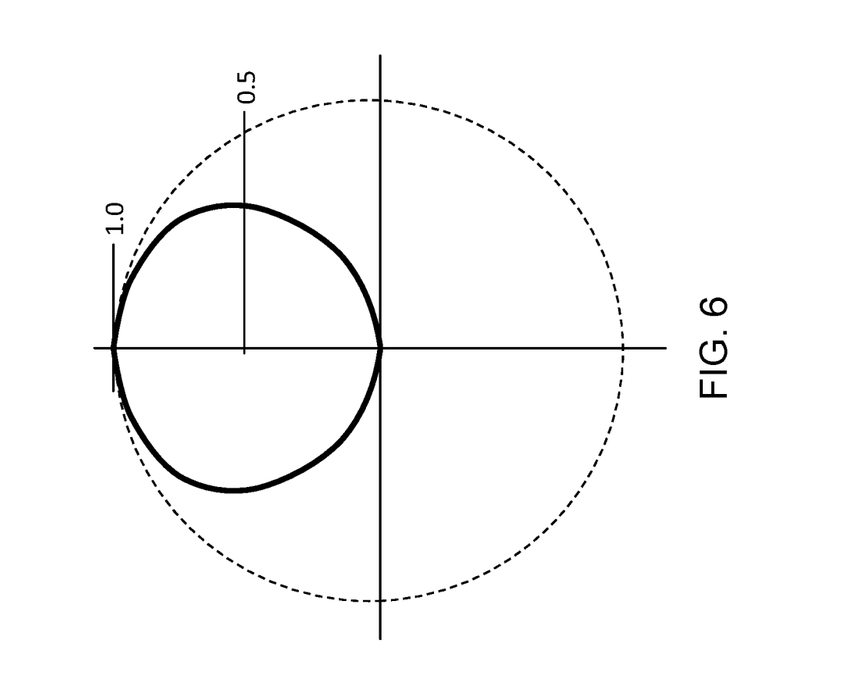
FIG. 6 shows a representative cross section of the free field polar response of the upward beam.
Figure 7:
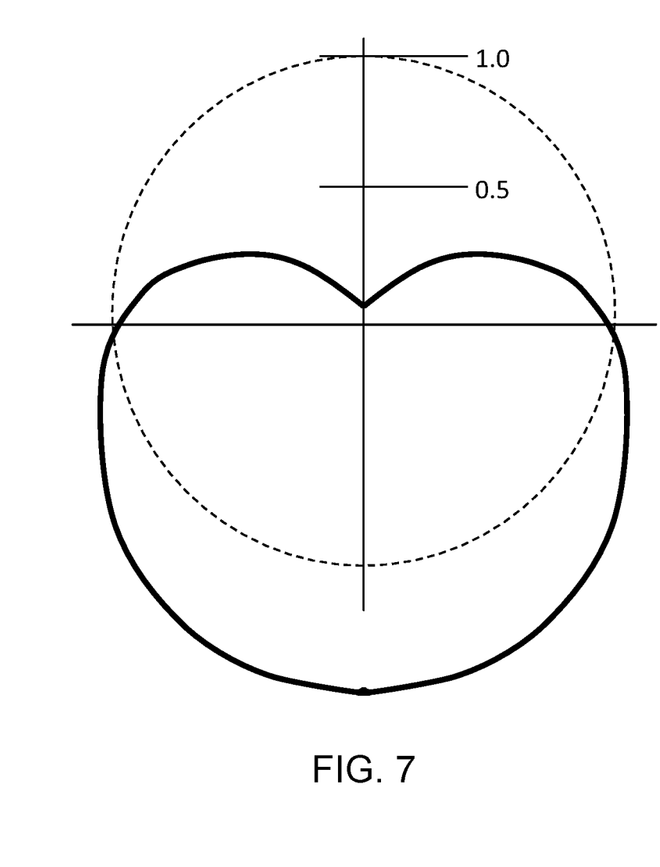
FIG. 7 shows a representative cross section of the free field polar response of the side facing beam.

For the Up channel 422, beamforming filter 502 is made that points upward while greatly attenuating the sounds coming from the side. The beamforming filter 502 takes each microphone (e.g., sampled microphone signals) as an input and makes a single output (upward beam 502a) by linearly combining the microphone signals. FIG. 6 shows a typical polar response of the upward facing beamformer 502. FIG. 7 shows the polar response of the side-facing noise reference beam filter 504. The side beam noise reference 504a is made so that it has a null in the upward direction to reject as much of the voice of the person wearing the pendant 102 as possible. Generally, this makes the side beam point somewhat downward.

To create the Side channel 424, the roles are reversed. The side beam 506a from filter 506 picks up the desired sound and the upward-facing beam becomes the noise reference. However, the upward beam noise reference 508a from filter 508 is not necessarily the same as the upward beam 502a from filter 502 designed to pick up the person wearing the pendant 102. They can be different, or they can be the same to save CPU cycles. To optimize performance, the beams will likely be different. The noise reference beam also services to remove general noise and not just the voice of the pendant 102 wearing person. So therefore, the upward noise reference beam may be slightly wider than the upward facing beam to pick up the pendant 102 wearing person.

Figure 8:
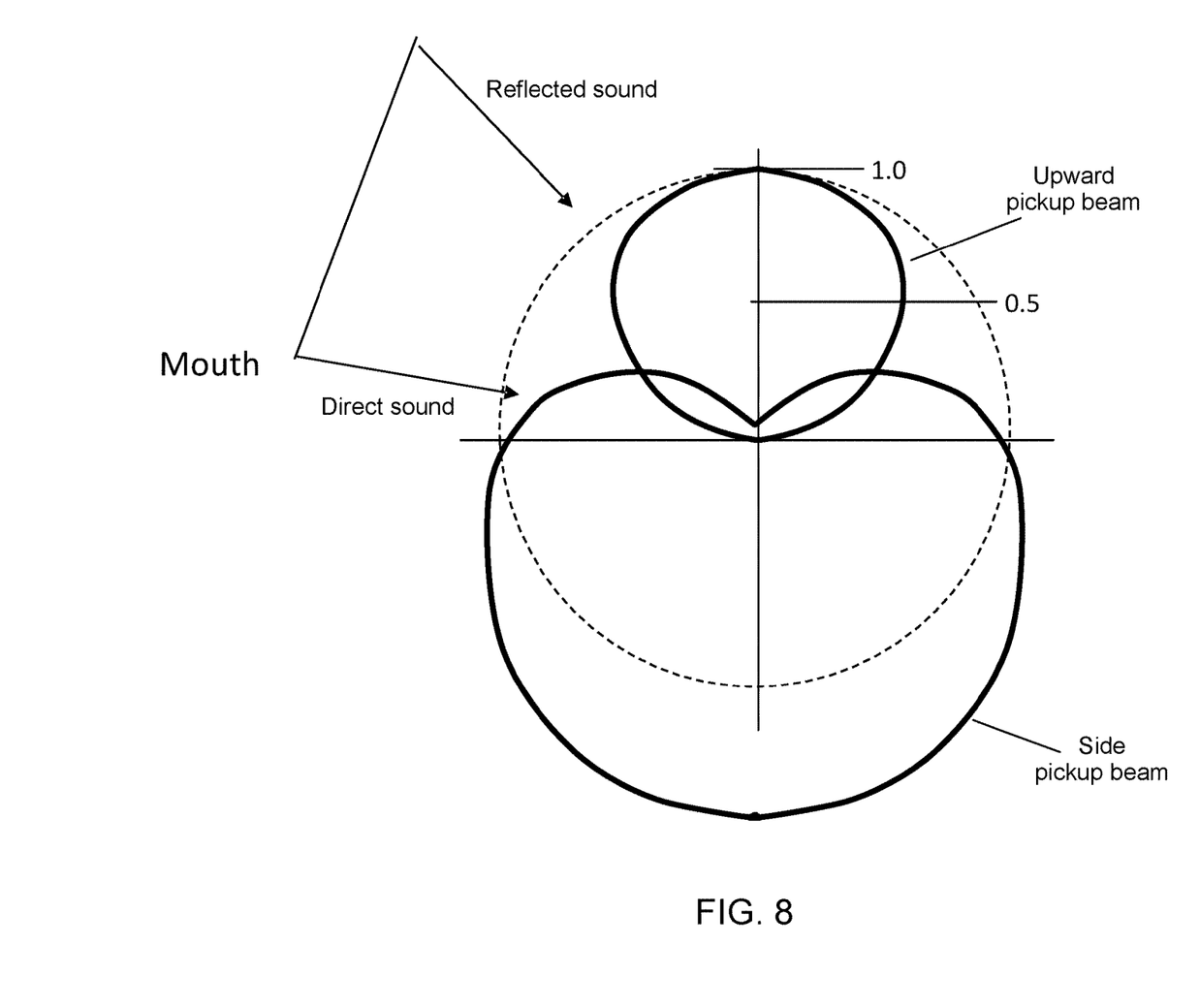
FIG. 8 shows the overlap between the upward beam and side facing beam.

After computing the beamforming filters, each signal 502a, 504a, 506a, 508a is partially channelized, but there can be considerable leakage of one beam into the other. FIG. 8 shows that there is some overlap between the upward and side beams and a reflected sound wave coming from the side may reflect off of the ceiling and enter the upward beam. So, to further clean up the signals 502a, 504a, 506a, 508a, the signals can be further processed with a form of spectral noise reduction where each signal is converted by a short-time Fourier transform (STFT) 408 to convert the time domain signals 502a, 504a, 506a, 508a into the frequency domain and then filtered by spectral noise reduction filters 410.

At this point, the sample rate is likely to be 16 kHz sample rate. Each STFT 408 operates on a block of samples. In some embodiments, for example, blocks can be 20 millisecond blocks (or 320 samples at 16 kHz sample rate) and the blocks are overlapped every 10 milliseconds (every 160 samples). For the Up channel processing the Up beam 502a is composed mostly of the desired signal and less of the sounds coming from the side, while the Side beam 504a is composed more of the unwanted side noise and less of the desired upward signal. For Side channel processing, the converse is true, with the Up beam 508a being composed of noise and the undesired upward source, and the Side beam 506a composed of the desired source and less of the upward source of sound. In each case, STFT of each signal is compared. The STFT is generally a discrete Fourier transform (DFT). The DFT consists of discrete frequency domain elements called bins. Presuming the DFT is a 512 point DFT, then there will be 257 frequency-domain bins. Each bin is compared. In general, the bins with more energy indicate the direction where the sound came from. However, because of nearby reflections and reverberation, the energy level in each bin is not necessarily a reliable indicator of where the sound came from. As a consequence, the per-bin decision becomes more complex. In addition, a decision is made by a weighted voting of the energies of all of the bins. Usually, only one person is talking, so it is possible to completely accept or completely attenuate the whole band. In general, the per-bin decisions help reject side and general noise and allow for cleaning of the desired signal. The full band decision allows for rejecting any signal energy if it is not coming from the person wearing the pendant 102 (for the Up channel processing).

It will be appreciated that a person of ordinary skill can imagine several heuristic techniques to make more accurate decisions to attenuate per bin other than using STFTs.

Once a decision is made, then an attenuation is applied either per-bin or to the entire band. The attenuation may be total or may be unity. Then the signal is converted to the time domain using usually the overlap add technique.

There are other techniques of doing signal separation. It is possible to do a linear computation such as independent component analysis (ICA). ICA uses adaptation of coefficients with a metric for minimizing the variance of each signal (component). It should be understood that ICA can supplement the beamforming. In some embodiments in accordance with the present disclosure, spectral noise reduction filters 410 are used for its robust character. As will be seen later, to produce the Side output channel, there may be more than one talker or signal source of interest. For the Up channel there is only one source, the person wearing the pendant 102.

To produce the Side channel, the converse occurs with some subtle differences. While it is possible that the roles of the Up beam and Side beam can simply be reversed, in general different beam shapes can be made to form the desired signal and the noise reference. For the sake of illustration, the beam shape of the desired signal will be similar to the noise reference beam of FIG. 7, and the beam shape of the noise reference will be similar to the beam in FIG. 6.

For spectral processing to extract the Side pickup, the parameters of the spectral noise reduction will be different. In general, people talking into the side beam are further away, so their sound contains more reverberation. Also, a person wearing the pendant 102 may be leaning over a table. In that case, the sound from their mouth is reflected off of the table back up, so in that case it is possible to pick up more sound from the side beam than the upward beam even though the primary sound is coming from the upward direction.

Figure 9:
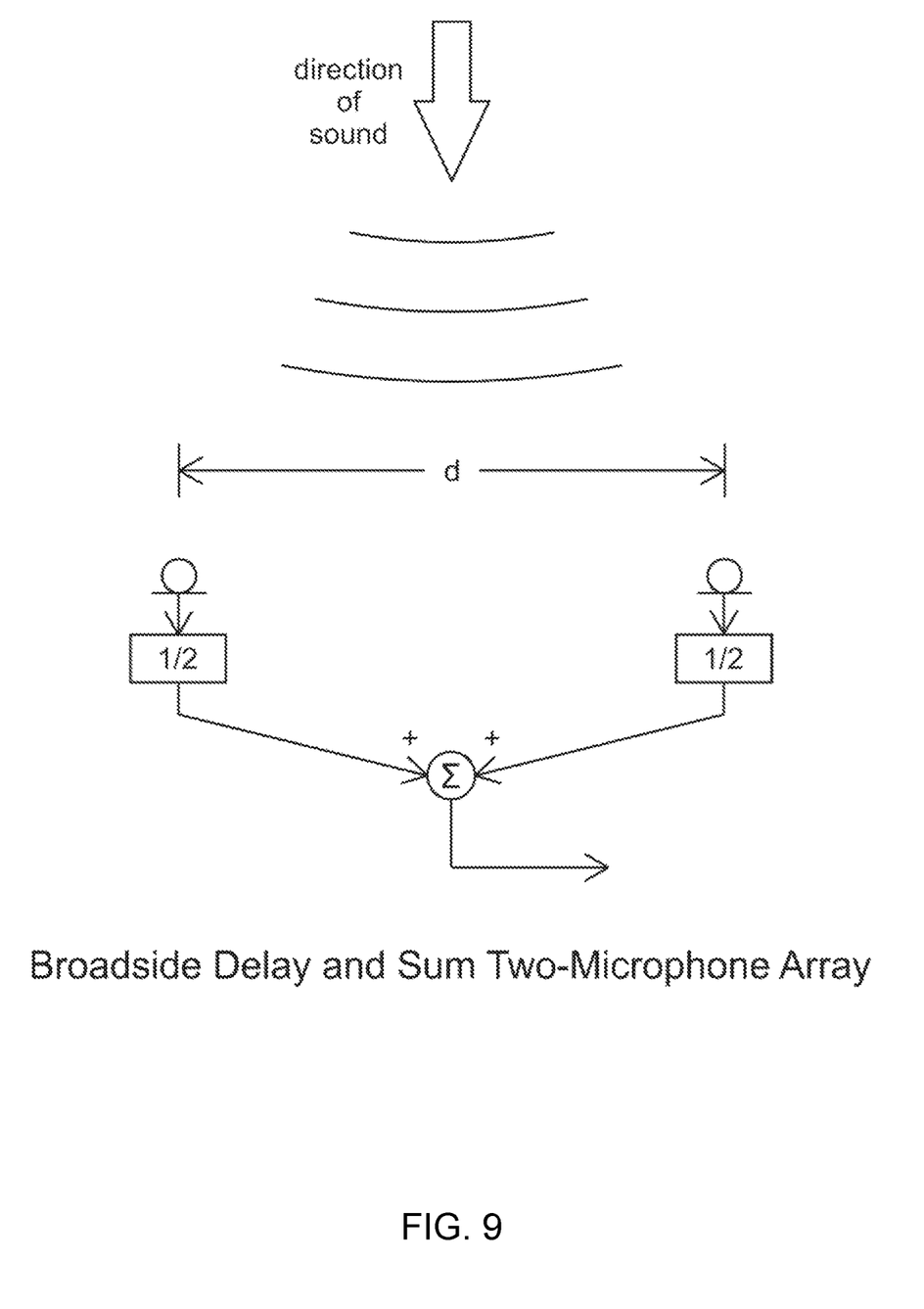
FIG. 9 shows a two-microphone delay and sum beamformer.
Figure 10:
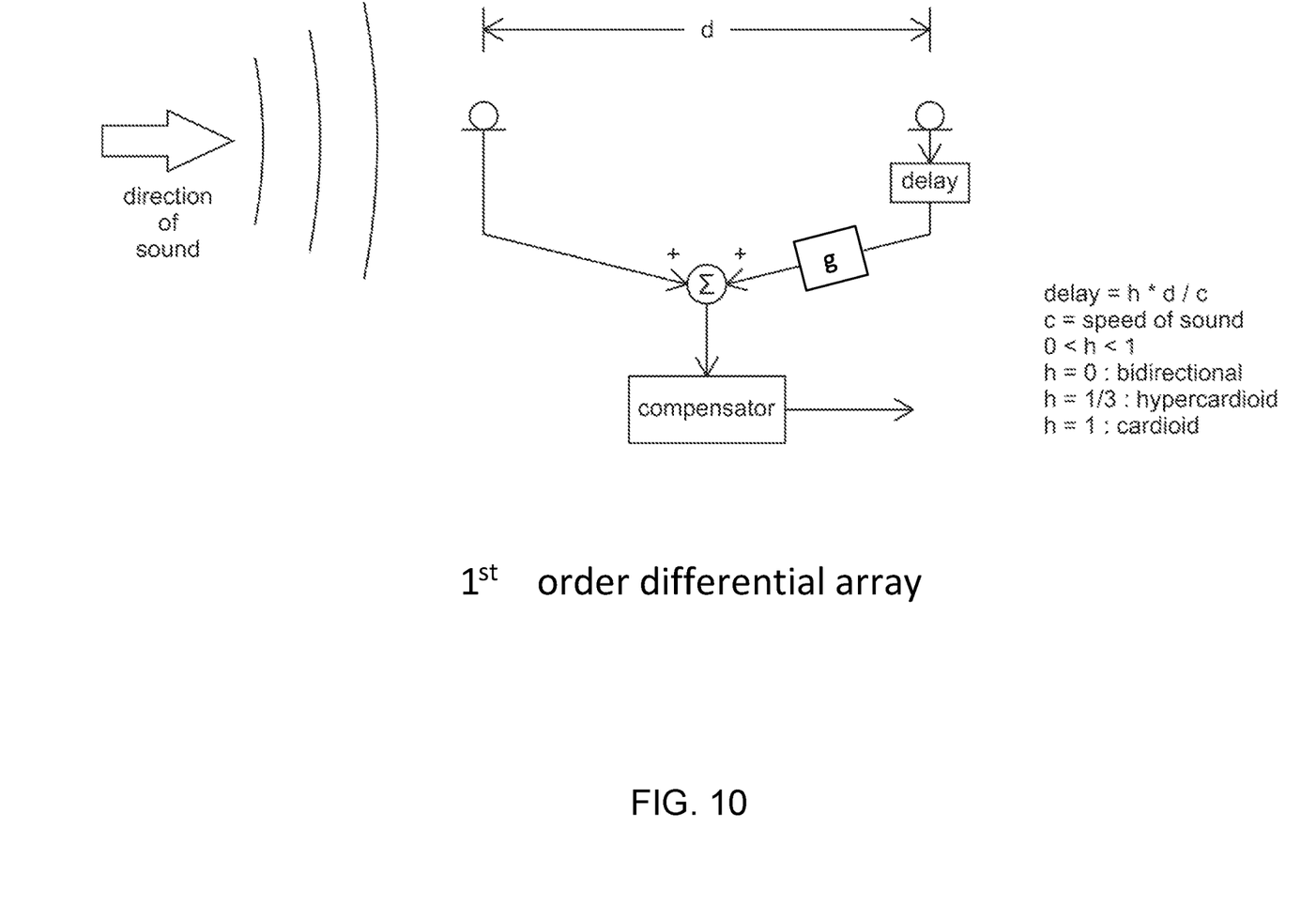
FIG. 10 shows a two-microphone first order differential microphone array

The side beam should ideally be as toroidal as possible. It is very difficult to design a toroidal beam shape, so it can only be approximated. The side beam should not pick up sound from the upward direction or sound from the downward direction. Usually there is not much sound from the downward direction except for the case where a table reflects sound upward. A way to defeat this situation is to use more microphones to achieve a more toroidal shape. If there are only two microphones, then the beam designer can choose to null out the primary sound from the person wearing the badge, with less regard for reflections off the table. However, it is possible to take advantage of the fact that the mouth of the person wearing the pendant 102 is usually about 20 centimeters from the pendant. To some degree the mouth of the person wearing the pendant 102 is in the "near field". This means that the designer can consider the fact that sound is propagating spherically and not in a planar wave. The advantage of this consideration is that the pickup of the side beam can cancel sound coming from 20 centimeters away. Consider an illustrative case where the microphones are spaced 6 centimeters. In some embodiments, a differential beam that cancels the voice of the person wearing the pendant 102 can be formed as follows:

$$y(t) = x(t) - g * x(t-\text{delay})$$

where
t=time
g=1−(60/200)=0.7
delay=distance/speed-of-sound
where the speed-of-sound is usually 343 millimeters per millisecond
delay=60/343 milliseconds To achieve a beam with a degree of toroidal pattern, some embodiments can use at least three microphones and preferably four or more microphones. With only two microphones a beam designer only has two choices, a delay and sum beam or a differential beam. The delay and sum beam is very limited. In either the upward direction or the side direction it is only effective at higher frequencies where the spacing between the microphones is close to ½ of the wavelength. For differential beams they can be effective across a much wider range of frequencies. A two-microphone delay and sum filter is shown in FIG. 9. A two-microphone differential beam filter is shown in FIG. 10.

Figure 11:
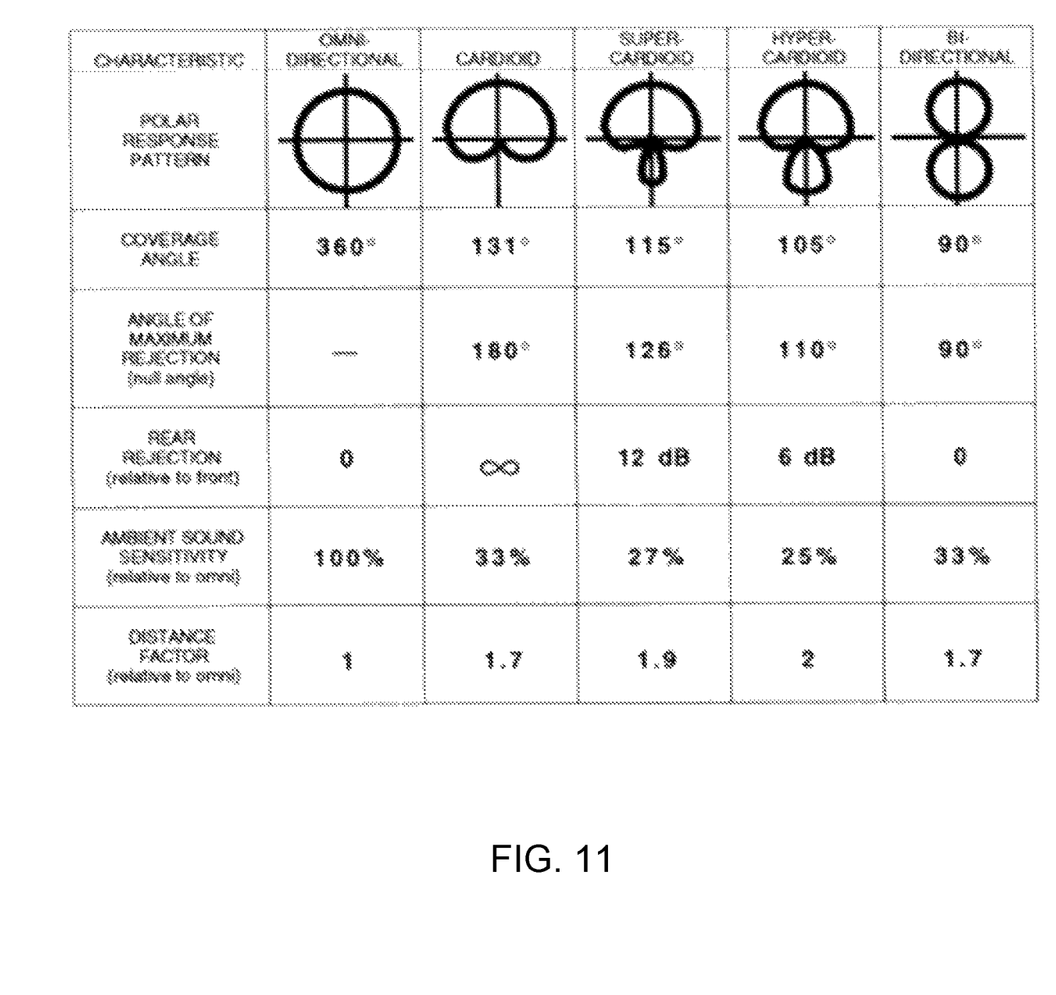
FIG. 11 shows a chart of first order variations of differential polar plots.

In some embodiments more than two microphones can be used. With three microphones, for example, it is possible to achieve a double-gradient differential beam. This can achieve directivity up to 3 dB better than a single gradient beam and it can totally reject direct sounds from the side while also rejecting sounds from below. Differential beams are most effective in the direction that the microphones are aligned. For upward pick up, the beam shape shown in FIG. 6 can be achieved. For a two-microphone differential beam only variations of cardioid, hypercardioid or bidirectional beams can be achieved. These are shown in FIG. 11.

Figure 12:
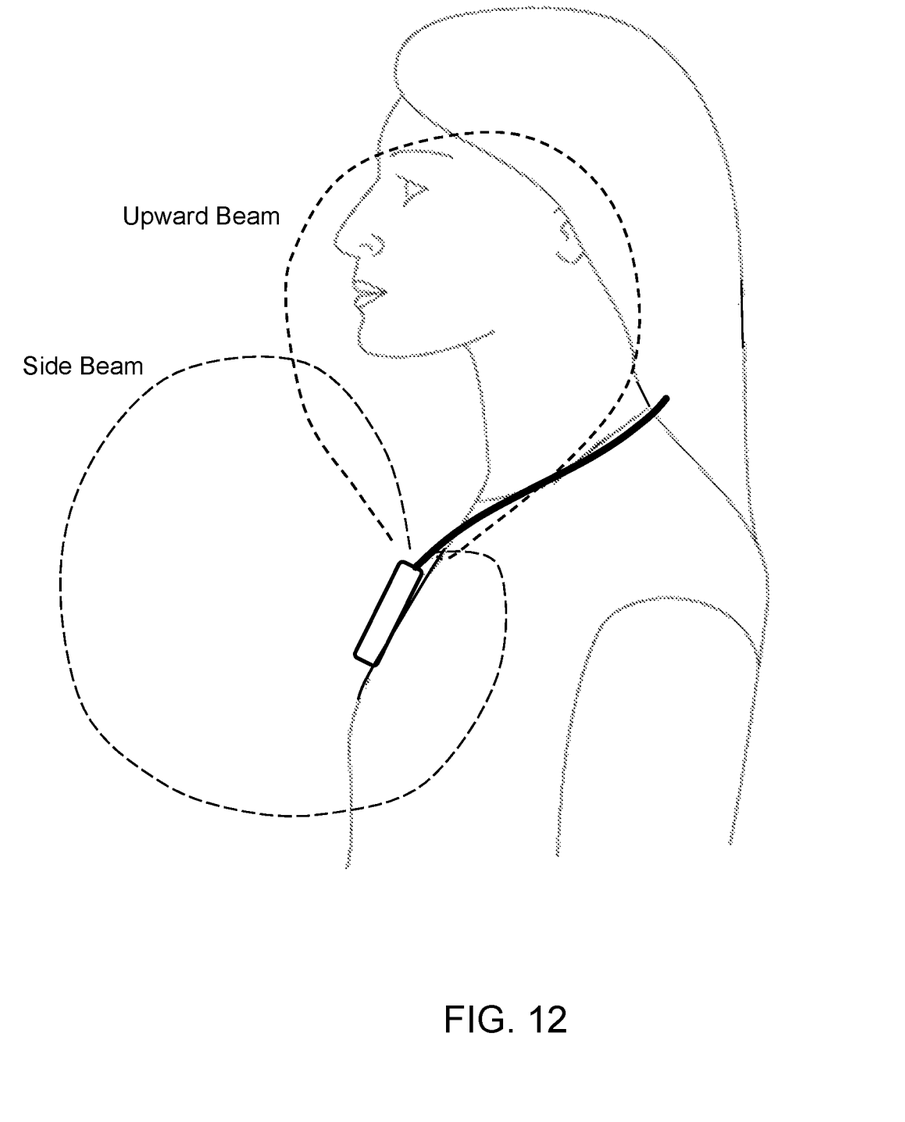
FIG. 12 shows a representative pickup pattern of the pendants beams in the upward and side-facing beams.

The beam shapes shown in FIGS. 6 and 7 are ideal shapes that would be achieved if the pendant 102 were suspended in free space. When the pendant 102 is worn on the human body, then the human body acts as a shield to sound. Sound can still reach the pendant 102 from behind a person due to refraction, but it is much reduced. FIG. 12 shows the approximate polar response for the upward beam and the side beam. A desirable effect of wearing the pendant 102 is that the pickup is stronger orthogonal to the person's chest. The chest presents a flat surface where sound arriving orthogonal to the chest has almost double the sound pressure, thereby utilizing the person's chest to create directionality for the side pickup.

As stated earlier, using more microphones will help the side beam look more toroidal. Keep in mind that if each microphone is merely summed then this will create a beam that more favorably picks up sound to the sides. The further the microphones are spread apart vertically, the lower the frequency will be where directionality is achieved.

Figure 13:
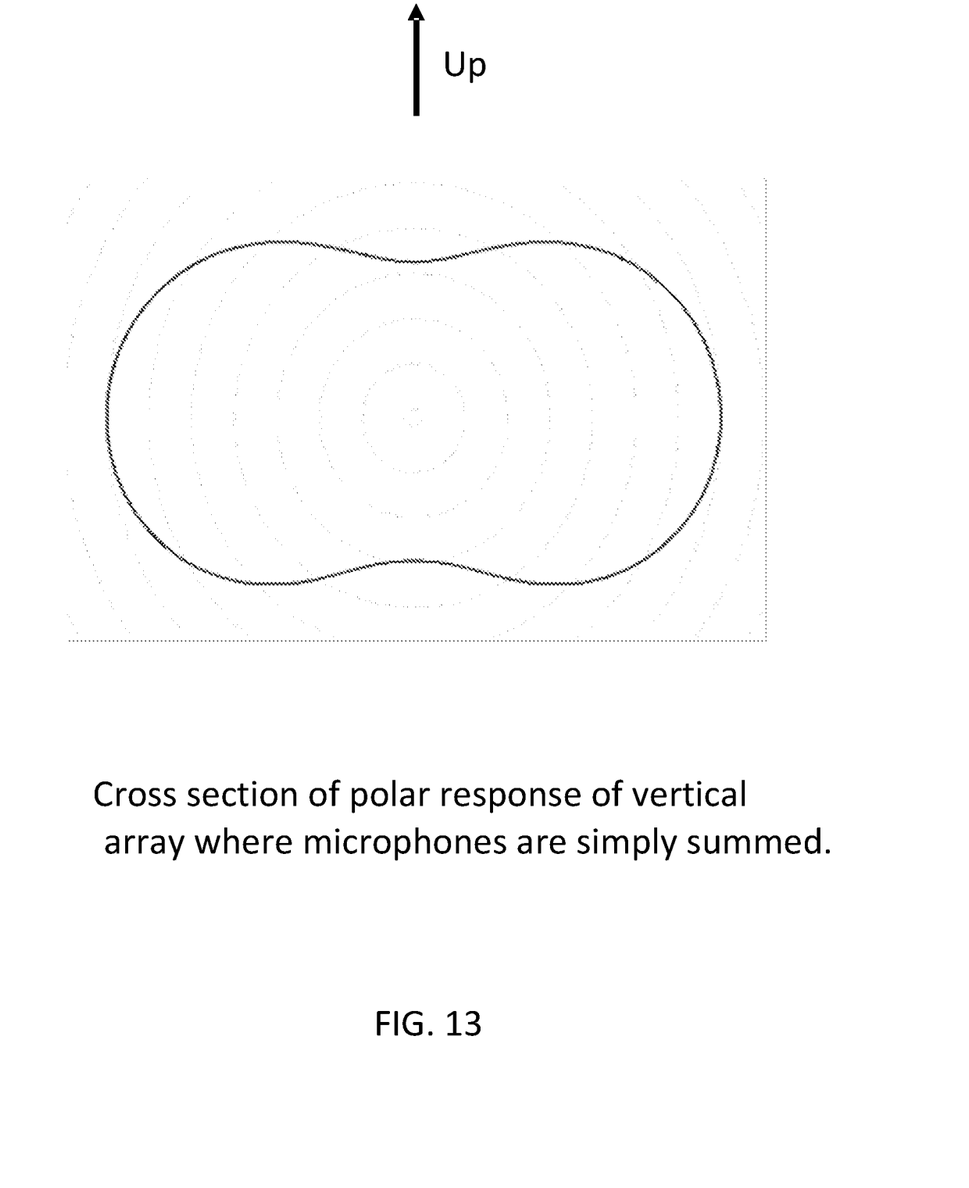
FIG. 13 shows a representative cross section a vertical array of microphones where the microphones are simply.

Applying a simple sum to the microphones to make a beam will provide a beam that is starting to look toroidal. A cross section of a toroidal beam made by a sum of 4 microphones with microphone spacing of 15 millimeters between the three top microphones and 30 mm between the bottom and third microphone at 4000 Hz provides a beam shape shown in FIG. 13.

To design the most effective side pickup beam a hybrid of differential and delay and sum beams can be made. As an example, with the four microphone array system, two first order differential microphone beams can be made. The first differential beam is made by utilizing the top microphone and third microphone. The second differential beam is made by utilizing the third microphone and the fourth microphone. Then each of these beam are summed together. The result is a beam that rejects sound from the upward direction and reduces noise from both the upward and downward directions. This beam design in combination with the natural directivity of a microphone on the user's chest makes for a good beam picking up sound orthogonal to the user's chest and thereby reduces general noise and the voice of the user leaving mostly the talker who is in front of the wearer of the pendant 102.

Figure 14:
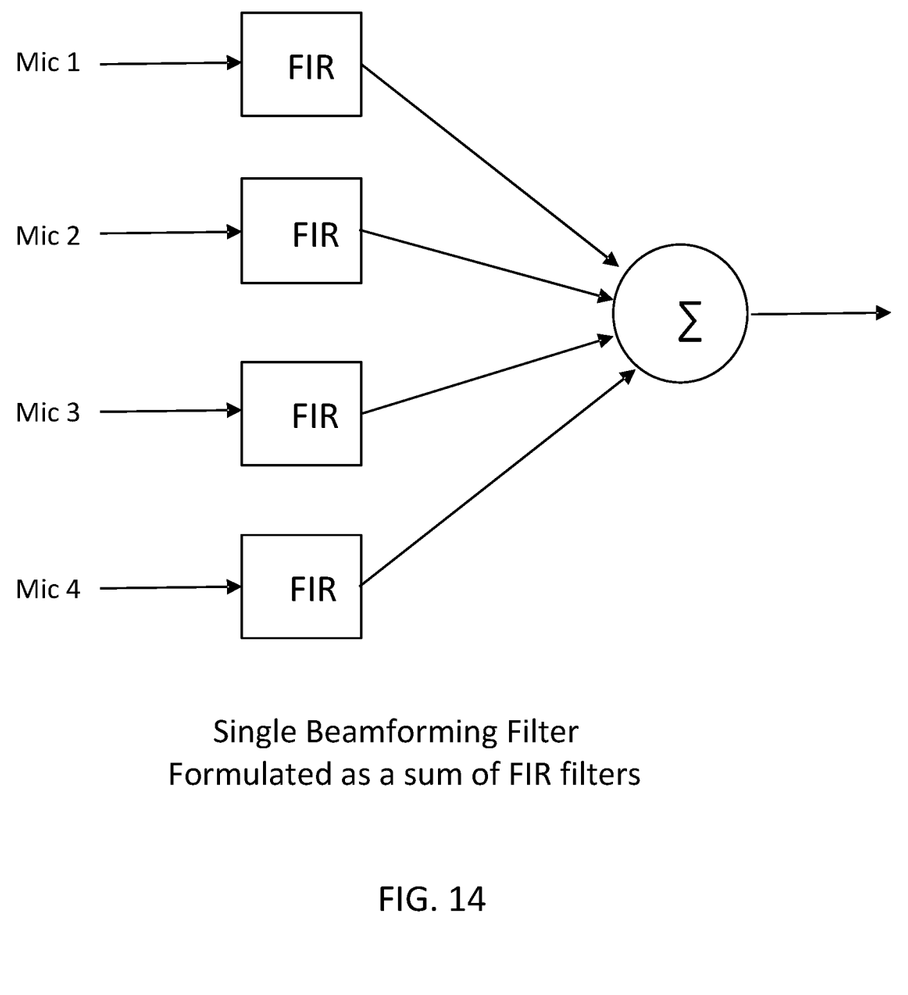
FIG. 14 shows a single beamforming filter formulated as a sum of FIR filters.

The differential beam designs described above are linear equations. A signal processing practitioner knows that the linear equations can be reformulated. In this case, it is convenient to reformulate the computations so that each microphone signal is filtered with a finite impulse response (FIR) filter and with the filtered versions of the other microphones to make the same beams as described above. So the reformulation of the beamforming spatial filters will provide a structure shown in FIG. 14.

Embodiments in accordance with the present disclosure include other physical features that either aid the performance to reduce noise and help channelization and features to make the device easy to use. The pendant 102 is designed so that it lies flat on the user's chest. The microphones can be located on the edge of the device or on the front face. The main goal is to utilize the user's chest to reinforce the amplitude of the sound waves coming mostly orthogonally to the user's chest. This will be accomplished if the microphones are within 2 centimeters of the user's chest. Since most speech and speech recognition systems operate only on speech as high as 7 kHz this is the highest frequency of sound that needs to be considered. The wavelength at 7 kHz is:

Wavelength=speed-of-sound/frequency

Wavelength=34.3 centimeters/7 kHz

Wavelength=4.9 centimeters

The sound pressure arriving at the chest orthogonally will cancel when the difference in distance between the reflected sound and the direct sound is ½ of the wavelength. Since the distance is twice the distance off of the chest, the cancellation will occur if the distance off of the chest is: 4.9/2/2=1.225 centimeters. However, since the pendant 102 presents a reflective surface at that small wavelength, the pendant 102 itself reinforces the sound even at 7 kHz, so keeping the microphones ported to the front of the device and away from the edge by about 1 centimeter is favorable acoustically.

In the illustration shown in FIG. 3 the microphone ports are located on the front face of the pendant 102. Besides the favorable acoustics, this is convenient for porting MEMS microphones from a single printed circuit board (PCB) and mating the PCB bearing the MEMS microphones to a plastic housing.

The pendant 102 has two attach points for a lanyard 104. This keeps the pendant 102 from flipping around, keeping the microphones, the buttons (e.g., record button 304, delete button 306) and the LED (indicator light 302) facing forward so that the microphones work better. The buttons 304, 306 remain easily accessible and the LED 302 indicating the recording is active is visible to any person who would want to know if they are being recorded. If there was only one attachment point, as there are on most lanyards that attach to a badge, then there is strong probability that the pendent would flip over if the person wearing the pendant 102 were to lean over.

The pendant 102 is equipped with a delete button 306. It is possible that a person might object to the fact they are being recorded, and they may not realize their objection until a significant amount of recording has been made. Therefore a delete button 306 is provided that will allow the user to delete the recording back to the point when the recording was initiated or a predetermined amount of time (5 minutes for example). The act of pressing the delete button 306 also produces a visual and possibly an audio indication to give a user confidence that a deletion has happened. For example, the LED 302 may flash red three times to indicate it is taking action and there may be an audible sound such as a beep or a flushing sound to indicate the action is complete.

The pendant 102 may be equipped with a 3-axis accelerometer to sense if the pendant is aligned with gravity. The accelerometer readings can be utilized to change signal processing parameters to more optimally channelize the signals. In general, the pendant 102 should be reliably sitting on the user's chest, but it might be raked back too far, or it might be tilted to the side. If the pendant 102 has too much tilt, then the processing software can flag the results as unreliable and then rely on automated diarisation to do a less reliable conversion of the conversation to a transcript.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:
    a wearable electronic pendant comprising:
        a pendant body having means for suspending the wearable electronic pendant;
        at least two pressure sensing microphones housed in the pendant body, the microphones having a substantially vertical alignment relative to a direction of gravity when the wearable electronic pendant is worn by the user; and
        circuitry to produce digitized samples of outputs from the at least two microphones; and
    means for computing an up channel digital signal and a side channel digital signal from digital samples comprising the digitized samples of the outputs of the at least two microphones, the means for computing including:
        forming an upward beam from a first combination of the digital samples;
        forming a side beam noise reference from a second combination of the digital samples;
        forming a side beam from a third combination of the digital samples;
        forming an upward beam noise reference from a fourth combination of the digital samples;
        processing the side beam noise reference and the upward beam to form the up channel digital signal which represents sound produced by the wearer of the pendant;
        processing the upward beam noise reference and the side beam to form the side channel digital signal which represents sound produced by one or more nearby talkers other than the wearer of the pendant; and
        storing the up channel digital signal and side channel digital signal in a non-volatile memory.

2. The system of claim 1, wherein the means for computing is a computing system separate from the wearable electronic device, wherein the circuitry includes communication circuitry to communicate the captured audio to the computing system.

3. The system of claim 1, wherein the means for computing is housed in the pendant body.

4. The system of claim 1, wherein the means for suspending comprises two attachment sites for attachment of a lanyard.

5. The system of claim 1, wherein the means for suspending comprises a clip that clips to clothing of the user.

6. The system of claim 1, further comprising a record button which, when activated, initiates a recording action to capture audio from the nearby talkers.

7. The system of claim 6, further comprising an indicator light to indicate that the microphones are capturing audio.

8. The system of claim 6, further comprising a delete button which, when activated, stops the recording action and deletes at least a portion of the audio captured since the beginning of the recording action.

9. The system of claim 1, wherein the wearable electronic pendant comprises at least three microphones that are vertically spaced apart along the direction of gravity when the wearable electronic pendant is worn by the user.

10. The system of claim 1, wherein the wearable electronic pendant comprises four microphones vertically spaced apart along the direction of gravity that span a length of substantially 60 millimeters.

11. The system of claim 1, wherein the upward beam is a differential beam that senses a gradient of the sound pressure sensed by the microphones and has a null or nulls below the horizon.

12. The system of claim 1, wherein the side beam is a hybrid delay and sum and differential beam facing downward with a null facing upward to cancel sound from the wearer.

13. The system of claim 1, further comprising an accelerometer to detect orientation of the wearable electronic pendant, wherein parameters used to form the upward beam, the side beam noise reference, the side beam, and the upward beam noise reference change when the accelerometer detects a change in orientation of the wearable electronic pendant.

14. A system comprising:
    a wearable electronic pendant comprising:
        a pendant body;
        two or more pressure sensing microphones housed in the pendant body, to detect sound produced by a wearer of the pendant and one or more nearby talkers, the two or more pressure sensing microphones having a substantially vertical alignment relative to a direction of gravity when the wearable electronic pendant is worn; and circuitry to communicate digital samples comprising digitized samples of the outputs of the two or more microphones to a remote computing system, the remote computing system to compute an up channel signal and a side channel signal using the digital samples, including:
    forming an upward beam from a first combination of the digital samples;
    forming a side beam noise reference from a second combination of the digital samples;
    forming a side beam from a third combination of the digital samples;
    forming an upward beam noise reference from a fourth combination of the digital samples;
    processing the side beam noise reference and the upward beam to form the up channel digital signal which represents sound produced by the wearer of the pendant;
    processing the upward beam noise reference and the side beam to form the side channel digital signal which represents sound produced by one or more nearby talkers other than the wearer of the pendant; and
    storing the up channel digital signal and side channel digital signal in a non-volatile memory.

15. The system of claim 14, further comprising a record button which, when activated, initiates a recording action to capture audio from the nearby talkers.

16. The system of claim 15, further comprising an indicator light to indicate there is a recording action in progress.

17. The system of claim 15, further comprising a delete button which, when activated, stops the recording action and deletes at least a portion of the audio captured since the beginning of the recording action.

18. The system of claim 14, wherein the wearable electronic pendant comprises at least three microphones that are substantially vertically aligned relative to the direction of gravity when the wearable electronic pendant is worn by the user.

19. The system of claim 14, wherein the wearable electronic pendant comprises four microphones, wherein a first microphone is vertically spaced substantially 15 millimeters from a second microphone, the second microphone is vertically spaced substantially 15 millimeters from a third microphone, and the third microphone is vertically spaced substantially 30 millimeters from a fourth microphone.

20. A wearable electronic pendant comprising:
a pendant body;
two or more pressure sensing microphones housed in the pendant body, to detect sound produced by a wearer of the pendant and one or more nearby talkers, the two or more pressure sensing microphones having a substantially vertical alignment relative to a direction of gravity when the wearable electronic pendant is worn; and
one or more processors housed in the pendant body,
the one or more processors configured to:
    produce digital samples comprising digitized samples of the outputs of the two or more microphones;
    use combinations of the digital signals to form beams, including:
        an upward beam formed from a first combination of the digital samples, to capture sound from the wearer;
        a side beam noise reference formed from a second combination of the digital samples;
        a side beam formed from a third combination of the digital samples, to capture sound from the talkers; and
        an upward beam noise reference formed from a fourth combination of the digital samples;
    use the side beam noise reference to remove residual noise from the upward beam to form an up channel audio signal that represents sound produced by a wearer of the pendant; and
    use the upward beam noise reference to remove residual noise from the side beam to form a side channel audio signal that represents sound produced by the one or more nearby talkers.

21. A wearable electronic device comprising:
a device body;
a plurality of microphones housed in the device body, the plurality of microphones having a substantially vertical alignment relative to a direction of gravity when the device is worn by a user; and
means for computing an up channel digital signal and a side channel digital signal using digital samples comprising digitized samples from outputs of the plurality of microphones, the computing including:
    forming an upward beam from a first combination of the digital samples;
    forming a side beam from a second combination of the digital samples, different from the first combination;
    performing first processing on the upward beam and the side beam to form the up channel digital signal, which represents sound from by the wearer of the device;
    performing second processing, different from the first processing, on the upward beam and the side beam to form the side channel digital signal which represents sound from one or more nearby talkers other than the wearer of the device; and
    storing the up channel digital signal and side channel digital signal in a non-volatile memory.

* * * * *